United States Patent [19]

Townsend et al.

[11] Patent Number: 5,102,736

[45] Date of Patent: Apr. 7, 1992

[54] PROCESS FOR THE MANUFACTURE OF REFLECTING GLASS AND THE PRODUCT THEREOF

[75] Inventors: Peter Townsend, Brighton, United Kingdom; Liberto Massarelli, Vasto, Italy

[73] Assignee: Societa Italiana Vetro-SIV-S.p.A., San Salvo CH, Italy

[21] Appl. No.: 618,507

[22] Filed: Nov. 28, 1990

[30] Foreign Application Priority Data

Nov. 29, 1989 [IT] Italy .................... 48162 A/89

[51] Int. Cl.$^5$ ............................. C03C 23/04
[52] U.S. Cl. .................... 428/410; 65/30.11; 65/30.13; 65/60.1; 427/38; 427/39; 427/165; 428/934
[58] Field of Search ............ 427/38, 39, 162, 163, 427/165; 65/30.13, 30.11, 60.1; 428/432, 934, 410

[56] References Cited

U.S. PATENT DOCUMENTS

| | | | |
|---|---|---|---|
| 3,902,881 | 9/1975 | Pirooz | 65/30.13 |
| 3,908,183 | 9/1975 | Ennis | 427/38 X |
| 3,958,262 | 5/1976 | Merrin | 357/2 |
| 4,395,467 | 7/1983 | Vossen et al. | 427/38 X |
| 4,840,816 | 6/1989 | Appelton et al. | 427/38 |
| 4,948,760 | 8/1990 | Ohwaki et al. | 65/30.13 X |

FOREIGN PATENT DOCUMENTS 1561784  3/1980  United Kingdom .

OTHER PUBLICATIONS

"Gold Ion Plating, A Recently Developed Coating Process" Glass Jun. 1978, pp. 299, 300, 303.

Pulker et al., "Reactive Ion Plating of Optical Films", Glastechnische Berichte, vol. 62, No. 3, Mar. 1989, pp. 100-105.

Derwent World Patent Index, Accession No. 88-179895 [26], Derwent Publications Ltd., London, GB.

Primary Examiner—Robert L. Lindsay
Attorney, Agent, or Firm—Wenderoth, Lind & Ponack

[57] ABSTRACT

A process for the manufacture of reflecting glass comprises implantation of ions of selected metal elements under selected conditions of temperature, energy and dosage in a glass substrate to obtain a product which has characteristics of light reflection and transmission rendering it suitable for advantageous use in the fields of vehicles and building construction.

6 Claims, No Drawings

PROCESS FOR THE MANUFACTURE OF REFLECTING GLASS AND THE PRODUCT THEREOF

BACKGROUND OF THE INVENTION

1. Field of the Invention

The present invention refers to a process for the manufacture of reflecting glass, particularly suited for use in the field of vehicles as a rear view mirror and/or side window and in the field of building construction for external glazing and/or non-opaque mirrors.

The present invention also refers to a reflecting glass obtained using said process.

2. Description of the Prior Art

Methods of manufacture of sheets of glass capable of being advantageously employed in the above mentioned fields and for the applications specified are known in the state of the art.

In general a glass made by said methods, at wavelengths comprised between 350 nm and 750 nm reflects a rate from 20% to 50% of the incident light in a perpendicular direction, and transmits, at the same wavelengths, a rate from 15% to 70% of the incident light.

Most recent are methods teaching a glass with those characteristics is produced by coating the surface of the glass to be in contact with the external environment, with at least one layer of dielectric material (in general a metal oxide).

The coating is obtained using the known method of vacuum cathodic sputtering, hereinafter called physical deposition, or using another known method consisting in the immersion of the glass in various chemical solutions, and successively the promotion of precipitation onto said glass of chemical substances, which method will hereinafter be called chemical deposition.

The product obtained according to the manufacturing methods mentioned hereinabove has several drawbacks: the coating is, in fact, exposed during its working life to atmospheric agents, as the deposition is carried out on the outer surface of the glass, and this causes deterioration and wear. In particular, in the case of deposition of layers using the physical method, the coating, while showing a resistance and endurance in line with the user specifications prescribed by the authorities of the USA and the EEC, has a shorter life than that produced using the chemical method.

On the other hand, the latter method is more expensive than the physical one, due to the complexity of its realization.

There is furthermore known in the state of the art, and this forms the object of European published patent application number 0318440, a process for changing the refraction index value in one or more layers of a sheet of glass, consisting in a suitable use of the ionic implantation method.

This method permits the formation of a homogeneous and continuous layer of a substance under the surface of the glass, by inserting into the molecular structure of the glass itself the ions of a selected element, at selected chosen conditions of glass temperature and ion dosages.

In particular, in the cited patent application, the ions of the elements argon, xenon, krypton, neon, helium, nitrogen or carbon were chosen which, when inserted into the molecular structure of the glass, at a certain depth, vary the refraction index of the same.

The use of this process gives the reflecting glass characteristics of notable duration and resistance to atmospheric agents, as the implanted layer is buried within the glass itself.

SUMMARY OF THE INVENTION

An object of the present invention is therefore to provide a process for the manufacture of reflecting glass which, using the implantation of ions of several chemical elements, suitably chosen, into a glass substrate, provides said substrate with the desired reflection characteristics.

A further object of the present invention is to provide a reflecting glass having reflection rates of incident light in a perpendicular direction comprised within a desired range of rates.

A further object of the present invention is to provide a glass having a transmission rate of incident light comprised within a desired range of rates.

The above objects have been obtained according to the present invention by means of implantation of ions of one of the following elements: silver, copper, gold, gallium, zinc or tantalum, into a sheet of transparent commercial glass, heated to a selected temperature and using selected doses of implanted ions.

In particular, in the case of implantation of the ions of the elements silver, gold, and copper the glass substrate is heated to a temperature from 100° C. to 200° C., the implantation dose is comprised between 4E16 and E17, and the power is 10 to 60 KeV.

In the case of implantation of the ions of gallium and zinc the glass substrate is heated to a temperature from 30° C. to 40° C. and the implantation takes place using doses comprised between 5E16 and E17, and using a power from 10 to 60 KeV.

In the case of implantation of tantalum ions the glass substrate is heated to a temperature from 100° C. to 200° C. and the implantation takes place using a dose comprised between 5E16 and E17 and a power 50 to 150 KeV.

The glass thus obtained reflects at wavelengths comprised between 350 nm and 750 nm a rate from 20% to 50% of the incident light in a perpendicular direction and transmits, at the same wavelengths, a rate comprised between 15% and 70% of the incident light.

In all cases the same implantation process can be repeated a number of times, in order to modify a suitable number of layers and thus obtain the desired light reflection and transmission rates.

An object of the present invention is therefore a process for the manufacture of reflecting glass, particularly suited for use in the field of vehicles as a rear view mirror and/or side window and in the field of building construction as external glazing and/or non-opaque mirrors, in which a sheet of glass is heated and at least one layer of a chemical element is formed by implantation of ions of said element in the glass substrate at the desired depth under the glass surface, characterized in that said element is selected from the group consisting of silver, gold, copper, gallium, zinc and tantalum, so that the sheet of glass shows a reflection rate from 20 to 50% and a transmission rate from 15 to 70% of incident light in a perpendicular direction at a range of wavelength from 350 to 750 nm.

The characteristics of the invention will be more clearly seen on consideration of the following examples of embodiment of the invention.

EXAMPLE 1

Silver ions were implanted in a sheet of transparent commercial glass, suitable to be used in building construction and in automobiles, heated to a temperature of 140° C. measured within the mass of the glass itself.

The implantation power was 60 KeV and the dose of ions was 5E16 ions per cm$^2$. After heat treatment of the glass at approximately 200° C., light reflection was measured in the glass equivalent to 50% of incident light in a normal direction and light transmission of 20% at a wavelength of 450 nm.

In the widest range comprised between 350 nm and 750 nm a minimum reflection rate equivalent to 20% and a maximum reflection rate equivalent to 50% of the incident light in a perpendicular direction were measured, along with a minimum transmission rate equivalent to 18% and a maximum transmission rate equivalent to 70%.

EXAMPLE 2

Gallium ions were implanted in a sheet of transparent commercial glass, suitable to be used in building construction and in automobiles, heated to a temperature of 37° C. The implantation power was 60 KeV and the dose of ions was E17 ions per cm$^2$.

A light reflection was measured in the glass equivalent to 50% of incident light in a perpendicular direction and a transmission rate equivalent to 30% at a wavelength of 450 nm.

In the widest range comprised between 350 nm and 750 nm reflection rates of incident light in a normal direction comprised between 37% and 50% and light transmission rates comprised between 15% and 50% were measured.

EXAMPLE 3

Tantalum ions were implanted in a sheet of transparent commercial glass, suitable to be used in building construction and in automobiles, heated to a temperature of 150° C. The implantation power was 100 KeV and the dose of ions was 7.5E16 ions per cm$^2$.

A light reflection was measured in the glass equivalent to 35% of incident light in a perpendicular direction and a light transmission equivalent to 40% at a wavelength of 450 nm.

Reflection rates of the incident light in a perpendicular direction from 27% to 35% and light transmission rates from 30% to 50% were measured in the broader range from 350 to 750 nm.

We claim:

1. A reflecting glass particularly suited for use in the field of vehicles as rear view mirror and/or side window and in the field of building construction as external glazing and/or non-opaque mirror, having a reflection rate from 20 to 50% and a light transmission rate from 15 to 70% of incident light in a perpendicular direction, at a wavelength range from 350 nm to 750 nm, said reflecting glass comprising a sheet of glass and an internal layer in the glass formed with implanted ions according to a process which comprises heating a sheet of glass, and forming at least one layer of a chemical element selected from the group consisting of silver, gold, copper, gallium, zinc and tantalum by implanting ions of said element into the glass at a desired depth under the glass surface, carrying out the implantation with an ion energy from 10 to 150 keV, an ion dose from 4 E16 to E17 ions per cm$^2$ and under a temperature of the glass substrate from 30° to 200° C.

2. A process for the manufacture of a reflecting glass, particularly suited for use in the field of vehicles as a rear view mirror and/or side window and in the field of building construction as external glazing and/or non-opaque mirrors, which process comprises heating a sheet of glass, and forming at least one layer of a chemical element selected from the group consisting of silver, gold, copper, gallium, zinc and tantalum by implanting ions of said element into the glass at a desired depth under the glass surface, carrying out the implantation with an ion energy from 10 to 150 keV, an ion dose from 4 E16 to E17 ions per cm$^2$ and under a temperature of the glass substrate from 30° to 200° C., said reflecting glass showing a reflection rate from 20 to 50% and a transmission rate from 15 to 70% of incident light in a perpendicular direction at a wavelength range from 350 to 750 nm.

3. A process as claimed in claim 2, in which said element is silver, gold or copper, said ion energy is from 10 to 60 keV, said ion dose is from 4 E16 to E17 and said temperature is from 100° to 200° C.

4. A process as claimed in claim 3, which further comprises heat treating said glass substrate at a temperature of about 200° C. immediately after the implantation is completed.

5. A process as claimed in claim 2, in which said element is gallium or zinc, said ion energy is from 10 to 60 keV, said ion dose is from 5 E16 to E17 and said temperature is from 30° to 40° C.

6. A process as claimed in claim 2, in which said element is tantalum, said ion energy is from 50 to 150 keV, said ion dose is from 5 E16 to E17 and said temperature is from 100° to 200° C.

* * * * *